United States Patent [19]
Fujimoto et al.

[11] 4,152,930
[45] May 8, 1979

[54] TORQUE-MEASURING DEVICE

[75] Inventors: Shoji Fujimoto, Nara; Tatsuo Matsushima, Kashihara, both of Japan

[73] Assignee: Koyo Seiko Company Limited, Osaka, Japan

[21] Appl. No.: 907,691

[22] Filed: May 17, 1978

[30] Foreign Application Priority Data

Oct. 31, 1977 [JP] Japan .............................. 52/131093

[51] Int. Cl.$^2$ .............................................. G01L 3/02
[52] U.S. Cl. .................................................. 73/136 R
[58] Field of Search ............................ 73/9, 95, 136 R

[56] References Cited

U.S. PATENT DOCUMENTS 2,601,780  7/1952  Baecher ............................ 73/136 R

OTHER PUBLICATIONS

C. A. R. Pearce—"An Electromagnetic Torquemeter for Use in Viscometry"—Journal of Scientific Instruments, vol. 30, Jul. 1953, pp. 232–236.

*Primary Examiner*—Charles A. Ruehl
*Attorney, Agent, or Firm*—Mason, Fenwick & Lawrence

[57] ABSTRACT

A torque measuring device. The device comprises a mount base which is supported by a housing for swing motion around the axis of an output rotary shaft and for mounting an output rotary shaft-driving rotary machine thereon and whose center of gravity is located on the axis of a bearing assembly, a torque transmitting lever with its center of gravity located on the axis of its pivot for transmitting torque to a second lever, which second lever has a distal arm carrying thereon a moving coil disposed in a fixed magnetic field and is adapted to have a torque in the mount base transmitted thereto at its proximal point of action, and a position detector which detects the position of the moving coil and feeds its current output corresponding to a variation in the position of the moving coil back to the latter. This device is handy to carry.

7 Claims, 6 Drawing Figures

TORQUE-MEASURING DEVICE

BACKGROUND OF THE INVENTION

The present invention relates to a portable torque measuring device for measuring torque, especially a torque which is involved in the assembling of bearings or other machine elements.

For example, for inspection of the assembling torque associated with the assembled state of bearings for the differential gear mechanism of an automobile, the wattmeter type torquemeter for measuring the power loss of a driving electric motor has heretofore been used. This is because there has been a demand for a small, lightweight torque measuring device in order to facilitate the use of such devices in the production shop.

The wattmeter type torquemeter comprises an electric motor and speed-reducer for rotating the shaft of an object to be measured, and a wattmeter for measuring the consumed power in said electric motor.

Let W be the consumed power in the motor, E the motor voltage and I the motor current. Then, $$W = E.I$$

On the other hand, between the load torque T and the motor voltage and current E and I, there is the following relation:

$$T = A(I)I1/NE(I) -$$

where N is the rpm and Tm is the mechanical loss torque. Here, A(I) and E(I) are functions of said current I, and as a method of compensating this, means, such as the one disclosed in Japanese Patent Opening No. 136468/1976, have been proposed. However, such prior art means require a special compensation-purpose electronic device, and it is technically and economically difficult to impart the capability of computing these compensation functions A(I) and E(I) to the portable torquemeter used in the field. Therefore, the wattmeter type torquemeter heretofore used is uncalibrated and poor in accuracy of measurement and there are cases where it cannot be put to practical use owing to voltage variations, etc.

As for the electrical torque-measuring method, the strain gauge, load cell, etc. have heretofore been used, but there are variations in their zero point caused in principle, making it necessary to make sufficient temperature compensation in order to assure accuracy which is stabilized for a long period of time over a wide range of measurement. Further, a torquemeter using a high precision strain guage, load cell or the like is complicated in construction and so large that it cannot be used as a portable torquemeter.

Further, in the measurement of a stick-slip type varying torque which is found among assembling torques in specially surface-treated bearings (and which has the characteristic of locally reducing the damping characteristic of the bearing as the rpm of the bearing increases, and is produced with a relatively low cycle), the power loss-detecting type torquemeter heretofore used is poor in vibration damping characteristc with respect to low-frequency varying torque, with the meter pointer fluctuating, so that reading is sometimes impossible or errors of reading are liable to occur. This phenomenon would not lead to an error of measurement if a time-consuming averaging operation is carried out, still it forms a major error factor where the meter is used for short-time inspection in the field.

SUMMARY OF THE INVENTION

An object of the invention is to provide a small, lightweight portable torque-measuring device having high accuracy of measurement, which, therefore, is capable of taking the place of the conventional power loss detection type portable torquemeter, thereby making it possible to simply and quickly measure the assembling torque in bearings used, e.g., in the differential gear mechanism of an automobile, in the production shop.

Another object of the invention is to provide a torque-measuring device for use for short-time measurement in the production shop, wherein the measured value indicating stability is extremely high and the accuracy of measurement is greately improved.

Another object of the invention is to provide a device which is free from factors leading to deterioration in accuracy due to year-dependent variations and environments, suffers almost no decrease of accuracy due to mechanical wear, and is highly reliable without requiring adjustment for a long time.

According to the invention, a rotary machine including an output shaft-driving electric motor is mounted on a mount base which is supported by a housing through bearings for swing motion around the axis of an output rotary shaft, and the center of gravity of the system of said members is adjusted so that it is located on the axis of the bearing assembly supporting the same. On the other hand, a torque-transmitting lever supported for swing motion on a shaft extending at right angles to the axis of sad bearing assembly, and a second lever supported for swing motion on a shaft extending parallel to the axis of said bearing assembly are installed in said housing. The front end of a lever-like projection on said mount base extending radially of the output shaft is contacted with said torque transmitting lever at the proximal point of action on the latter, while the distal point of action on the torque-transmitting lever is contacted with the proximal point of action on the second lever. Installed on the front end of an arm of said second lever which is the distal side of the latter is a moving coil positioned in the fixed magnetic field of a magnetic circuit device fixed to the housing, while position detecting means for detecting the displacement of said coil is installed on the housing. The torque-transmitting lever and the second lever including the moving coil are adjusted so that their respective centers of gravity are located on the axes of pivots supporting them.

The position detecting means described above comprises an electronic device which detects the position of the moving coil and feeds its current output corresponding to a variation in the position thereof back to the moving coil so that the torque produced in the mount base during the torque measurement can be balanced by the torque acting on the second lever through the moving coil. Thus, by detecting the value of the current flowing through the moving coil, the measured torque value for the object to be measured can be obtained.

In addition, the intensity of the magnetic field of said magnetic circuit device is set so that it is much higher than the intensity of the magnectic field produced by said moving coil.

Therefore, according to the invention, since the system comprising the rotary machine and mount base and the system comprising the torque transmitting lever and second lever have their centers of gravity located on the axes of their respective support shafts, there is no possibility of the components being influenced by gravity during the operation, nor is the possibility of measured values fluctuating. Thus, the accuracy of measurement is improved, and the handling and measurement can be carried out simply, easily and quickly.

Since the portable torquemeter is held by hands when it is used, a torque which is equivalent to the torque to be measured is transmitted to the operator's hands, so that vibrations produced in the same direction as said torque in the measuring device cannot be avoided. According to the invention, this problem is solved in that the ratio of the moment of inertia of the mount base system to the moment of inertia of the second lever system is made equal to the leverage $(l_1l_3)/(l_2l_4)$ (see FIGS. 1 and 2) obtained through the torque-transmitting lever, thereby preventing the decrease of accuracy.

In connection with the measurement of the stick-slip type varying torque found among torques associated with the assembing of bearings, the position detecting means is provided with a vibration damping function with respect to low-frequency varying torque. This function, coupled with the previously described functions, assures quickness and ease in making measurements in the production shop.

Therefore, according to the invention, as compared with the conventional power loss detection type portable torquemeter, the accuracy of measurement is surprisingly improved, and particularly in the measurement of the torque involved in the assembling of the bearings of the differential gear mechanism of an automobile, an accurate and easy measurement can be made. As for the object to be measured, the invention is not limited to the measurement of said torque involved in the assembling of the bearings of the differential gear mechanism and it is generally applicable to the measurement of torque in mechanical devices having a rotary shaft. The torque measuring device of the invention is free from factors leading to deterioration in accuracy due to year-dependent variations and environments and suffers almost no decrease of accuracy due to mechanical wear, so that it is capable of making highly reliable measurements without requiring adjustment for a long time.

Other objects and features of the invention will become apparent from the following description.

DESCRIPTION OF THE PREFERRED EMBODIMENT

Figure 1:
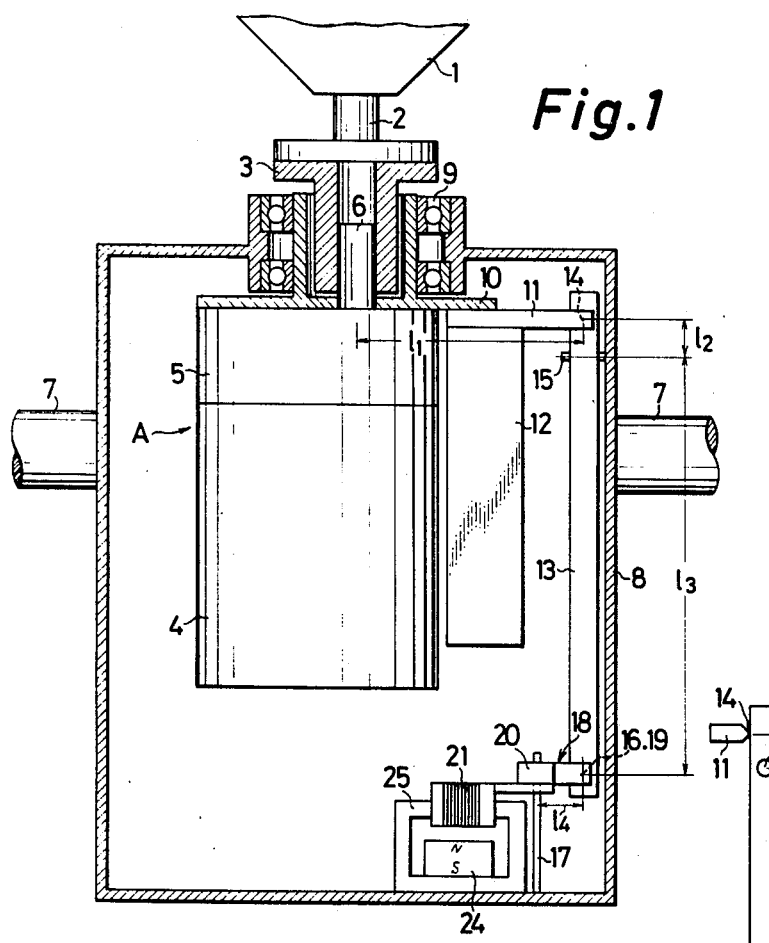
FIG. 1 is a cross-sectional view schematically showing an embodiment of the invention.
Figure 2:
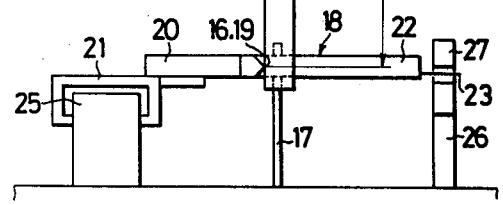
FIG. 2 is a side view of the principal portion thereof.
Figure 3:
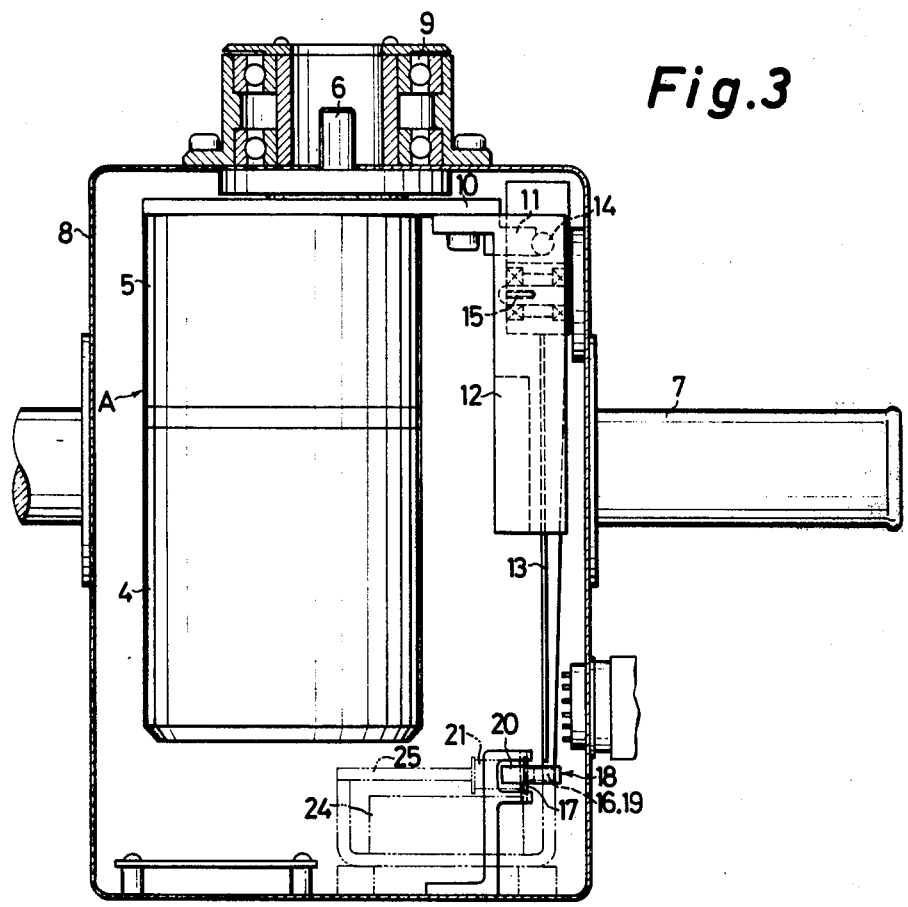
FIG. 3 is a front view, partly in longitudinal section, of the principal portion of a concrete example of the invention.
Figure 6:
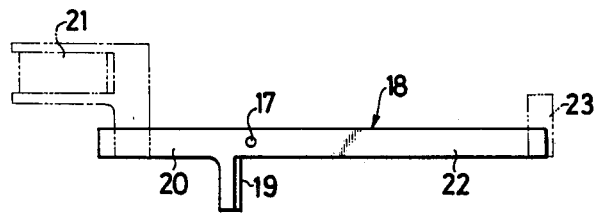
FIG. 6 is an enlarged plan view of a second lever.
Figure 4:
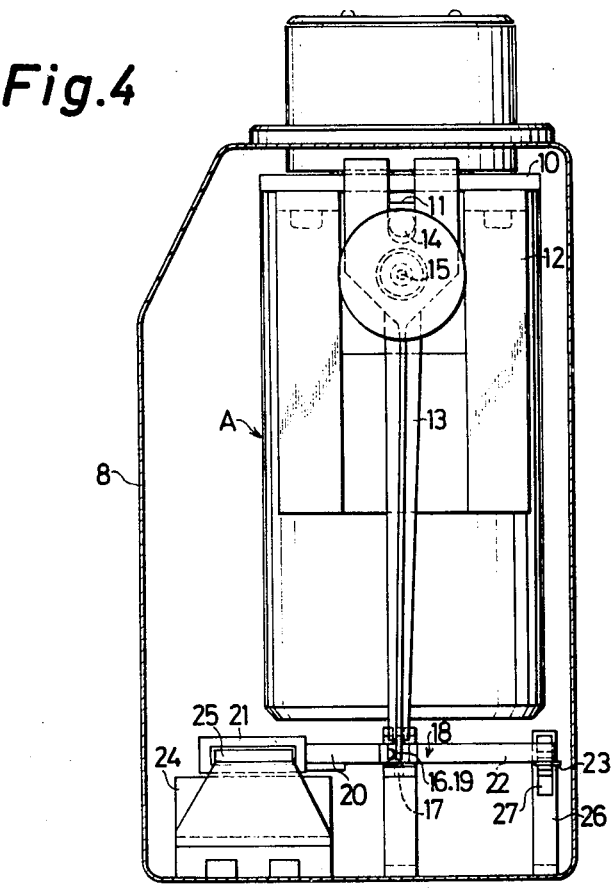
FIG. 4 is a view, partly in longitudinal section, taken laterally of FIG. 3.

FIGS. 1 and 2 are views schematically showing an example of the present invention and FIGS. 3 and 4 show a concrete form thereof. In the figures, the numeral 1 designates, e.g., the differential gear mechanism of an automobile having unillustrated bearings assembled thereto, said bearings supporting a shaft 2, to the end of which is connected a torque measuring coupling 3 through which the shaft 2 to be inspected is connected to the output rotary shaft 6 of a rotary machine A comprising a motor 4 and a speed-reducer 5.

The rotary machine A is mounted on a mount base 10 which is supported by a housing 8 having handles 7 through low friction bearings 9 so as to be swingable around the axis of the output rotary shaft 6. The output rotary shaft 6 is rotated at a fixed speed.

The mount base 10 has a lever-like projection 11 extending therefrom radially of the output rotary shaft 6, and a balance weight 12. The center of gravity of the system comprising the rotary machine A and mount base 10 is located on the axis of the output rotary shaft 6, and the front end of the lever-like projection 11 is contacted with a torque transmitting lever 13 at the proximal point of action 14 on the latter. The lever 13 is supported for swing motion on a pivot shaft 15 extending from said housing 8 at right angles to the output rotary shaft 6 and it is in the form of an elongated rod on its distal side while its proximal side is formed with a bifurcated thick portion, as shown in FIGS. 3 and 4, the center of gravity of said lever 13 being located on the axis of the pivot shaft 15.

The distal point of action 16 on the torque-transmitting lever 13 is contacted with the proximal point of action 19 on a second lever 18 supported for swing motion on a pivot shaft 17 disposed parallel with the output rotary shaft 6 and extending from the housing 8.

The second lever 18 has a moving coil 21 mounted on the distal arm 20 thereof and a slit plate 23 mounted on the other arm 22 and is approximately T-shaped in plan view, with its center of gravity located on the axis of the pivot shaft 17.

A magnetic circuit device comprising a permanent magnet 24 and a magnetic circuit iron core 25 extending through said moving coil 21 to form the magnectic circuit for the latter is installed in the housing 8, with said moving coil 21 disposed in the fixed magnetic field of the permanent magnet 24. A holder 26 is fixed to the housing 8 for holding a photoelectric position detector 27 comprising an illustrated light-emitting element and light-receiving element opposed to each other, with the slit plate 23 of said second lever 18 disposed in front of the clearance between the photoelectric elements of said detector.

The fixed magnetic field produced by the permanent magnet 24 and magnetic circuit iron core 25 is set so that it is much stronger than the magnetic field produced by passing electricity through the moving coil 21. Generally, the power device which is constituted by the permanent magnet 24 magnetic circuit iron core 25 and moving coil 21 is known as a linear actuator. In the case of the present invention, when a current flows through the moving coil 21 to produce a magnetic field countering the fixed magnetic field of the permanent magnet 24, the intensity of the fixed magnetic field, if low, is caused to vary by said counter magnetic field, sometimes producing an error in the measurement of torque. Therefore, the invention is so arranged so that there will be no variation in the intensity of the fixed magnetic field otherwise caused by the influence of the magnetic field produced by the moving coil 21.

Figure 5:
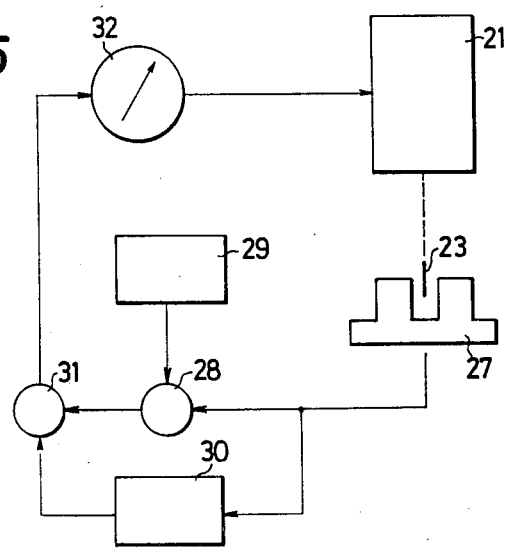
FIG. 5 is a view showing an example of an electronic circuit included in position detecting means.

FIG. 5 shows an example of a feedback control circuit whereby when the photoelectric position detector 27 detects the displacement of the moving coil 21 and produces a current output proportional to said displacement, said output is fed back to the moving coil. More particularly, an output signal produced in the photoelectric detector 27 by the displacement of the slit plate 23 is added to a signal from a position setting signal generator 29 in an adder 28 and at the same time it is differentiated by a differentiating circuit 30, the output signals from said adder 28 and differentiating circuit 30 being combined by an adder 31 whose output is fed back to the moving coil 21 through an ammeter 32.

In operation, the shaft 2 to be inspected is coupled to the output rotary shaft 6 by the coupling 3 and the rotary machine A is rotated with the handles 7 held by hands, whereupon the torque associated with the assembling of the object to be inspected, i.e., the bearings supporting the shaft 2 acts as a reaction torque on the mount base 10 and tends to rotate the latter, This reaction torque acts on the torque transmitting lever 13 through the lever-like projection 11 and then acts on the second lever 18. Since these levers 13 and 18 are supported for swing motion on their respective pivot shafts 15 and 17 through low friction bearings, the second lever 18 is rotated around the axis of the support shaft 17. Such movement is detected by the photoelectric position detector 27 associated with the slit plate 23 and an output signal is produced from the photoelectric position detector 27 corresponding to the displacement of the slit plate 23.

On the other hand, the moving coil 21 is positioned in the fixed magnetic field of the magnetic circuit device comprising the permanent magnet 24 and magnetic circuit iron core 25. Therefore, the moving coil 21 tends to displace the second lever 21 when a current is passed through the moving coil 21, so that a torque proportional to the current flwoing through the moving coil 21 is produced in second lever 18. Thus, the output signal from the photoelectric position detector 27 is added to the output signal from the position setting signal generator 29 at the adder 29, so that a position control current flows through the moving coil 21 to control the position of the latter, acting to correct the deviation of the slit plate 23 from the set position designated by the position setting signal generator 29. In this connection, the adder 28 may be designed to have a sufficient amplification degee to assure that the amount of deviation of the slit plate 23 is so small that it will be practically negligible. The control signal differentiated by the differentiating circuit 30 acts as a damper for said feedback control to absorb the vibrations in the measuring system produced by the varying torque. Particularly, in the measurement of the stick-slip type varying torque found among torques associated with the assembling of bearings having a special surface treatment applied thereto as described above, the measurement indication stability is satisfactory, providing much higher accuracy than in the conventional torquemeter and making it possible to make an accurate measurement within a short time. Further, since the centers of gravity of the rotary machine and mount base system and such centers of the levers 13 and 18 are located on the axes of their respective bearings, there is no possibility of the components being influenced by gravity. The principles of operation described above are independent of gravity and there is no possibility of the measured value varing irrespective of the direction in which the device is directed.

Let $l_1$ be the distance from the point of contact between the lever-like projection 11 and the torque transmitting lever 13 (the proximal point of action 14) to the axis of rotation of the mount base 10; $l_2$ be the distance from the point of action 14 to the axis of the pivot shaft for the lever 13; $l_3$ be the distance from the axis of said pivot to the distal point of action 16; and $l_4$ be the distance from said contact point of action 19 (the same as the point 16) to the axis of the pivot shaft for the lever 18. The axes of the output rotary shaft 6 and the pivot shaft 17 of the lever 18 are parallel with each other, and if the axis of the pivot shaft 15 for the lever 13 is arranged so that it is disposed on a plane intersecting said axes at right angles, and if the measuring device oscillates or swings at the angular acceleration $d\omega/dt$, then the angular acceleration of the lever 13 around the axis of the pivot shaft 15 is 0 while the angular accelerations of the mount base 10 and lever 18 around the axes of their respective rotary shafts are $d\omega/dt$. Let $I_1$ and $I_2$ be the moments of inertia of the mount base 10 and lever 13 around the axes of their respective rotary shafts. Then, the troques $T_1$ and $T_2$ produced in the mount base 10 and lever 18, respectively, are $T_1 = I_1 d\omega/dt$ and $T_2 = I_2 d\omega/dt$. That is, $T_1/T_2 = I_1/I_2$. The torques produced around the axis of the pivot shaft 17 for the lever 18 by $T_1$ and $T_2$ are $T_1 l_2/l_1$ and $T_2 l_3/l_4$, which are mutually oppositely directed torques. If, therefore, the device is so arranged that $T_1 l_2/l_1 = T_2 l_3/l_4$, that is, $I_1/I_2 = (l_1 l_3)/(l_2 l_4)$, then the measuring device will be free from factors leading to measurement errors due to vibrations.

In addition, the feedback control circuit is not limited to what has been shown in the embodiment, and various modifications may be made.

What is claimed is:

1. A torque measuring device comprising:
   a housing provided with handles,
   a rotary machine provided with an output rotary shaft for imparting rotation to a rotary body which is an object to be inspected,
   said rotary machine including an electric motor,
   a mount base supported by said housing for swing motion around the axis of said output rotary shaft and supporting said rotary machine and contained in said housing together with said rotary machine,
   said mount base being provided with a lever-like projection extending radially of said output rotary shaft, the center of gravity of the mount base including said rotary machine being located on the axis of bearings installed in the housing for supporting said output rotary shaft,
   a torque transmitting lever supported for swing motion on a pivot shaft installed in said housing,
   said lever being positioned so that its center of gravity is located on the axis of said pivot shaft and that its proximal point of action is contacted with the front end of the lever-like projection on the mount base,
   a second lever supported for swing motion on a second pivot shaft provided in said housing,
   said second lever being positioned so that its proximal point of action is contacted with the distal point of action on said torque transmitting lever, said second lever having a moving coil mounted on its arm forming the distal side, the center of gravity of said second lever including said coil being located on the axis of its pivot shaft,
   a magnetic circuit device including an magnetic iron core fixed to said housing and extending through said moving coil, said magnetic circuit device forming a magnetic circuit in which said moving coil is positioned, and position detecting means disposed in said housing to detect variations in the position of said moving coil, said means including an electronic circuit device arranged so that its current output corresponding to a variation in the position of the moving coil is fed back to the latter to assure that a torque produced in said mount base is balanced by a torque acting on the second lever through said moving coil during the measurement of torque, the value of the current flowing through said moving coil being detected to thereby measure the torque.

2. A torque measuring device as set forth in claim 1, wherein said second lever is provided with a distal arm having said moving coil mounted thereon with respect to its arm having the proximal point of action, and another distal arm having a position detecting member associated with the position detecting means for detecting the position of the moving coil, said position detecting means including a photoelectric detector comprising a light-emitting element and a light-receiving element opposed to the latter, said position detecting member on said second lever being disposed in front of the optical path between said light-emitting element and said light-receiving element.

3. A torque measuring device as set forth in claim 2, wherein said position detecting member on said second lever is a slit plate.

4. A torque measuring device as set forth in claim 1, wherein the electronic circuit for said position detecting means includes a differential circuit for damping vibrations caused by low-frequency varying torque in the measurement of varying torque.

5. A torque measuring device as set forth in claim 1, wherein said magnetic circuit device is arranged so that the intensity of the fixed magnetic field is much higher than the intensity of a magnetic field produced by passing electricity through the moving coil.

6. A torque measuring device as set forth in claim 1, wherein the axis of the bearings for said mount base is parallel with the axis of the pivot shaft for said second lever; the axis of the pivot shaft for said torque-transmitting lever lies on a plane intersecting the axes of said pivot shafts at right angles; and the ratio of the moment of inertia of the system comprising said rotary machine and mount base to the moment of inertia of said second lever is equal to the leverage obtained through said torque transmitting lever.

7. A torque measuring device as set forth in claim 1, wherein said mount base is supported by said housing through low friction bearings, and said torque transmitting lever and second lever are supported through low friction bearings.

* * * * *